April 19, 1932.  H. H. THOMPSON  1,854,870
DAMPER FOR GYROCOMPASSES
Filed Jan. 27, 1927
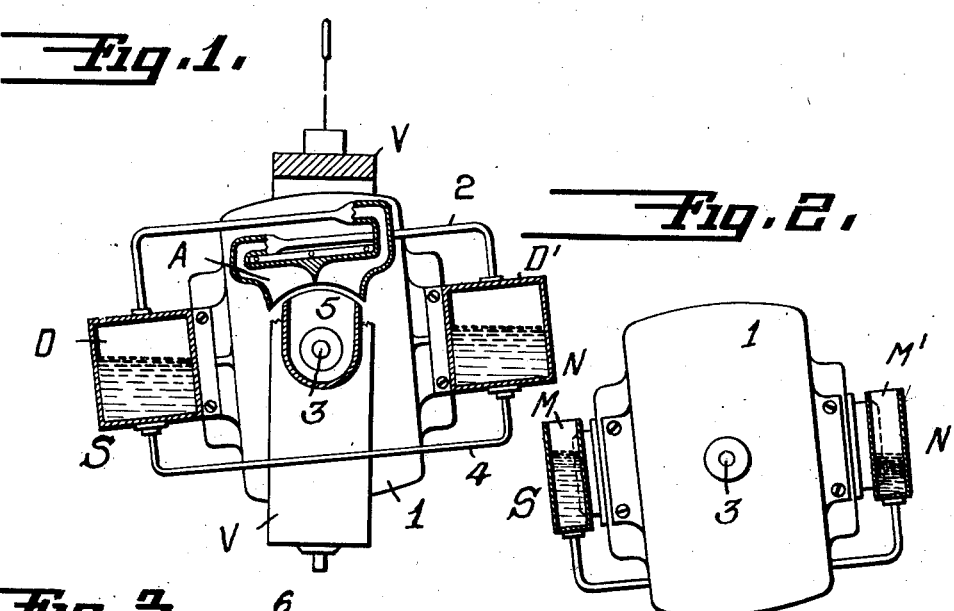
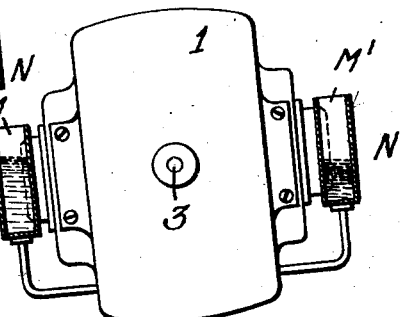
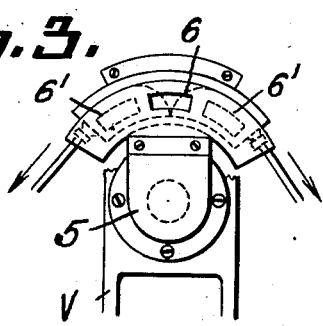
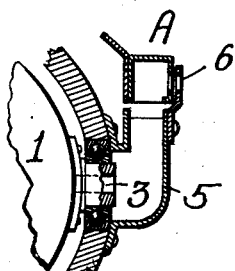
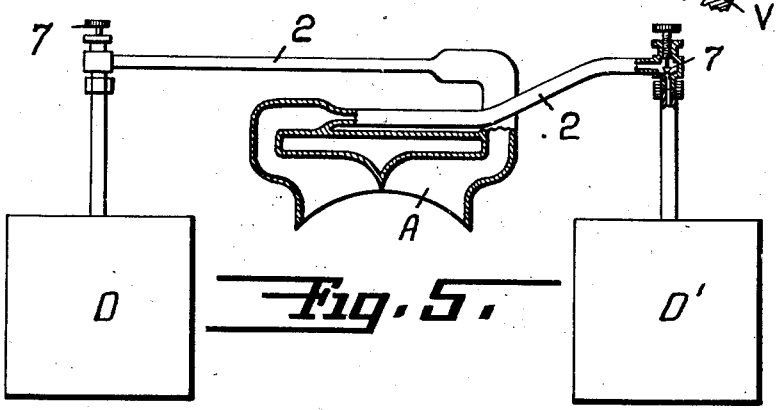
Herbert H. Thompson INVENTOR Patented Apr. 19, 1932

1,854,870

UNITED STATES PATENT OFFICE

HERBERT H. THOMPSON, OF MOUNTAIN LAKES, NEW JERSEY, ASSIGNOR, BY MESNE ASSIGNMENTS, TO SPERRY GYROSCOPE COMPANY, INC., OF BROOKLYN, NEW YORK, A CORPORATION OF NEW YORK

DAMPER FOR GYROCOMPASSES

Application filed January 27, 1927, Serial No. 163,876, and in France July 16, 1926.

This invention relates to gyro compasses and has for its chief object to provide an improved form of gyro compass which will not only seek the North or "orient" and assume a correct settling position, but will be substantially immune from disturbance by rapid acceleration pressures such as result from change of speed or course of a sea or air craft carrying the same.

In order to produce orientation in a compass without rendering it liable to suffer from what is known as "quadrantal error", symmetrically balanced gyroscopes provided with a movable liquid mass system which shall give the necessary orienting torque have been employed. Since the gyro axle takes up diffrent resting positions, relative to the meridian, according to the course and speed of the craft, these being the known and proper positions under every condition, it is necessary that the "ballistic deflection" from one position to another be correctly given. This can only occur when the liquid mass is moved by the resultant of acceleration due to change of course or speed and one other force. The force of gravity being necessarily present, it is desirable that gravity should act alone as the said force to create and to apply the orienting torque, as has been disclosed in the art. Alternatively, as is also known, the transfer of liquid mass for orienting can be effected by means of air pressure acting against gravity, but this interferes with the ballistic deflection of the gyroscope during rapid acceleration and introduces another class of error.

In gyroscopic compasses in which a freely supported gyroscope has one degree of freedom partially suppressed so as to cause it to oscillate across the meridian, it is commonly necessary to make it settle by providing means for damping these oscillations. It is further customary to employ the force of gravity as a means of suppressing this degree of freedom, with the consequence that the direction of gravity as indicated by its force must be associated with the damping system. Accordingly, the damping system becomes responsive to all external forces such as those due to horizontal acceleration. That is to say, when the craft in which such a compass is carried changes its course or speed, the acceleration so occasioned is impressed upon the damping system, in addition to the force of gravity, and this has the effect of disturbing the natural function of this system and setting up an oscillation of the compass. This "damping error" becomes appreciable in fast-moving craft, and in craft such as warships which are subject to frequent and rapid manœuvring. The error is in fact such as seriously to limit the usefulness of gyro compass in aircraft.

It is known to damp the oscillations of gyro compasses by means of communicating liquid containing vessels between which the liquid flows through a constricted path under the force of gravity when tilt occurs. It has further been proposed to reinforce gravitational flow of liquid for the same purpose by means of air pressure. In either event the effect of acceleration is to cause liquid to surge axially along the gyro from one vessel to the other. An out-of-balance torque is thus set up, causing the oscillation of the gyro which is the damping error referred to above. This effect is increased when air pressure is employed to aid the flow of damping liquid.

More specifically stated, therefore, the chief object of the present invention is to provide such an arrangement of the constituent parts of the damping system of a gyrocompass, that it shall be inherently corrected against the effects of horizontal acceleration. Means have been proposed whereby special devices such as valves are to be used in order to put the damping system out of action during acceleration. Such means are not only complicated but require additional special mechanism to detect turning of the ship to bring into action the damping eliminator or else said damping eliminator must be hand-controlled. According to the main feature of my invention no such special devices are required, the damping system being self-balancing in respect of horizontal acceleration and no extraneous mechanism is required.

Bearing in mind that damping itself in the case of using communicating liquid-containing vessels involves an out-of-balance condition which during rapid horizontal acceleration would respond thereto and give rise to disturbance of the compass, it is to be understood that the self-balancing referred to is such that during the slow oscillations coincident with the slight tilt of the gyro in precessing across the meridian the necessary amount of out-of-balance for damping is maintained but that during the relatively large tilt resulting from rapid acceleration substantially all out-of-balance is suppressed, or in other words, a substantially true balance is maintained, or at least a harmful or unwanted change of balance during this time is prevented. As already stated, the important feature of the system is that the above-mentioned conditions involve no additional devices to those known in principle in the art, but are rendered inherent in the system as hereinafter explained.

My invention, therefore, briefly stated, consists in the novel combination of an orienting system controlled by gravity alone, with a damping system operated by a second, or external force so acting in opposition to gravity as to permit damping in normal circumstances but to establish and maintain a balanced condition of the gyro during periods of acceleration.

By using an orienting system controlled by gravity alone I secure that the necessary ballistic deflection for every change of course or speed is obtained and such a system may conveniently take the form of a pair of communicating liquid containing vessels operating under gravity.

In order that the damping system may be effective for its normal purpose, namely damping, and yet function as above stated during acceleration, the external force is correspondingly regulated or controlled. For the purpose in view I may employ a pair of liquid containing vessels connected by a constricted passage and control the transfer of liquid by power means acting to move the liquid against gravity. Such means may conveniently take the form of a differential air pressure system.

During tilt of the gyro the slow oscillations incidental to precession would cause a gravitational flow of the damping liquid and the amount of differential air pressure built up during such oscillations is of course sufficient not only to prevent such flow but to effect an actual transfer in the opposite direction. During acceleration, however, the amount of differential air pressure required is merely such as to prevent the flow of liquid that the acceleration would of itself produce, but is not such as to produce an actual transfer in the opposite direction.

The angles through which the gyro tilts relatively to the true vertical during precession are small relatively to the angles between the true vertical and the apparent vertical resulting from such accelerations as are the cause of appreciable disturbance of the compass and in addition the latter occurs much more quickly. This contrast in size of the angles and/or the time differential enables me to arrange the air distributing system to discriminate between the two conditions.

In order that the invention may be clearly understood and readily carried into effect, I will now describe the same more fully with reference to specific embodiments represented in the accompanying drawings in which:—

Figure 1 is a diagrammatic sectional side elevation of the compass,

Fig. 2 is a similar view with certain parts removed,

Figs. 3 and 4 are fragmentary views of a modified form of the air control parts, and Fig. 5 is a fragmentary view of a further modification.

The gyro casing 1 is carried on trunnions 3 in the so-called vertical ring V. This ring, being penduously supported and its position in the vertical being independent of the gyroscope, may be used as a baseline or pendulum to detect relative tilt of the gyroscope about its horizontal trunnions 3 in the vertical ring. The gyro wheel spins clockwise as viewed at its north end, and its casing carries two pairs of liquid-containing bottles MM' and DD' fixed on the west and east sides respectively.

The bottles MM' are mounted on the west side of the gyro-axis and are for securing north-seeking precession. Their function is well understood.

The bottles DD' mounted on the east side of the gyro-axis are for damping and they and their contained liquid acting in conjunction with a differential air pressure arrangement constitute the damping system. The east trunnion 3 of the gyro-casing is hollowed to admit of the escape of air under pressure from the rim of the gyro wheel, so that the issuing air can enter, and pass vertically upwards through a wide nozzle 5 fixed to the vertical ring. The mouth of the nozzle 5 delivers air into a divided air chest A which is mounted over the nozzle and carried by the gyro casing. This chest feeds air pipes 2, leading to the damping bottles DD', in the sense that the static pressure set up in each of its north and south compartments is communicated to the surface of the liquid in the bottles.

By properly shaping the contours of the mouths of the nozzle and air chest the differential pressure set up in one of the bottles DD' as compared with the other can be correctly related not only to the very small angles of tilt between the gyro axis and the vertical ring while the gyro is precessing but also to the relatively greater angles of tilt of the pendulously mounted vertical ring arising out of appreciable acceleration, in order that the necessary discrimination above-mentioned may be brought about. It will be understood that there must necessarily be a point at which the air pressure relation for damping merges into the second air pressure relation wherein transfer of liquid is counteracted or inhibited, the occurrence of this point being determined by the minimum acceleration of which it is desired to take account. Moreover, this necessary change of relationship between the differential air pressure and the tilt, which may be considered as two opposing means, may be effected by other means, such as the provision of a by-pass or the like cooperating with the air nozzle 5 as shown for example by the cooperating ports 6, 6' in Fig. 3 so that while the differential pressure set up per unit relative angle has one value for damping, it has a different and lesser value per unit relative angle for the larger range of relative angles consequent upon accelerating forces.

In order to damp, I do not allow liquid to run downhill, through a constriction, as has heretofore been proposed, but having allowed a gravitational displacement of liquid through the constricted pipe or passage connecting the bottles MM' for the north-seeking purpose, we damp by shifting damping liquid in the other direction, namely, in the construction shown, through the more constricted pipe or passage 4 between the bottles DD'. The air pressure in the damping system may be so arranged that subject to the delay action in the pipe 4 a head of damping liquid in the bottles DD' opposite in effect to the head in the bottles MM' is created, so as to give a torque opposing that due to the head of liquid in the bottles MM' out of phase therewith and of such a value as to produce the desired rate of damping. To this end, of course, and assuming mercury to be used in the bottles MM' and oil in the bottles DD', the cross section of the oil bottles DD' will be greater than that of the mercury bottles MM' depending upon the head of damping liquid created by a given air pressure.

Now consider the effect of acceleration in a northerly direction. The vertical ring tilts through a relatively large angle following the resultant line of gravity and acceleration, and an excess of air pressure is set up in one bottle. This tends to drive the damping fluid from south to north. At the same time acceleration is acting on the damping liquid in such a way as to make it try to surge from north to south. Were it free to do so, it would find itself in time with its surface normal to the line of resultant force. But the contours of the effective parts of the air nozzle and air chest when the tilt is large as above-mentioned are such that the differential air pressure tends to produce only such a head as will maintain the liquid at or restore it to the normal line. There is therefore no appreciable transfer of damping liquid; the damping system automatically balances itself under the two opposing forces, no damping fluid is piled up in one bottle or the other, and no damping error appears after the turn or change of speed.

Meanwhile the precessing fluid in the bottles MM' is left entirely free to surge through to the natural, inclined, level, providing the head of liquid required to give the ballistic deflection.

This invention is not confined to the precise construction illustrated. For example the transfer of damping liquid might be effected by suction instead of by pressure, or by any other device whereby such flow of liquid as is permitted to occur is in proportion to tilt and in opposition to gravity. Furthermore, the rate at which the air pressure can become built up may be rendered regulatable by suitable means as for example by adjustable needle valves 7 in the air pipes 2 as shown in the fragmentary illustration of Fig. 5. By a careful adjustment of these valves, the rate of building up of the air pressure in the bottles DD' may be so regulated as to prevent the air pressure from causing contro-acceleration surging of the liquid (i. e. surging in the contrary direction to the natural direction of flow under the acceleration force action) but to permit the air pressure to build up sufficiently to prevent the natural surge of the liquid under the acceleration force.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination with a gyro compass having a gravitational factor, of a liquid damping mechanism therefor separate and distinct from said gravitational factor and including a slow acting power source brought into action by tilt of the gyro for forcing the liquid against gravity, said power source being designed so as to build up sufficiently slowly so that it substantially balances without overpowering the tendency of the liquid to flow when acted on by acceleration forces due to changes of speed or course.

2. In a gyroscopic compass of the top-heavy or counter-earthwise rotating type, a pair of inter-connected liquid containers for imparting gravitational control thereto under the free flow of the liquid, a second pair of inter-connected liquid containers for damping the compass, including means responsive to tilt of said compass, and power means controlled thereby for forcing the liquid against its natural direction of flow and out of phase with the compass oscillations.

3. The combination with a gyro compass having a gravitational factor of the top heavy type, of an improved damper therefor separate and distinct from said gravitational factor and comprising connected liquid containers on opposite sides of the gyroscope, means for exerting pressure on said liquid in a direction counter to its natural flow for damping, pendulous means for controlling said pressure means upon relative tilt of said gyroscope and pendulous means, and a controller for actuating said pressure means disproportionately to the relative tilt of said gyroscope and pendulous means whereby actuation of the damper takes place only by the tilts of the gyroscope in its oscillations about the meridian.

In testimony whereof I have affixed my signature.

HERBERT H. THOMPSON.